United States Patent Office 2,791,579
Patented May 7, 1957

2,791,579

WATER INSOLUBLE THIODIAZOLE MONOAZO DYESTUFFS

Karl Taube, Leverkusen-Bayerwerk, Germany, assignor to Farbenfabriken Bayer Aktiengesellschaft, Leverkusen, Germany, a corporation of Germany No Drawing. Application April 6, 1954,
Serial No. 421,437

Claims priority, application Germany April 13, 1953

7 Claims. (Cl. 260—158)

The present invention relates to new water insoluble monoazo dyestuffs and to a process of making the same; more particularly it relates to monoazo dyestuffs free from sulfonic and carboxylic acid groups corresponding to the following general formula

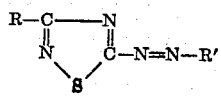

wherein R stands for hydrogen, alkyl, alkoxy or aryl and R' for the radical of a coupling component.

The new monoazo dyestuffs can be obtained by coupling diazotized 5-amino-1,2,4-thiodiazoles, with such coupling components as are free from sulfonic and carboxylic acid groups. Since the diazo components used in this process possess a great coupling energy they combine also with compounds which ordinarily are not employed in the manufacture of azo dyestuffs.

The diazo components characteristic for the above process and for the new dyestuffs are known from German Patent 842,346.

The new dyestuffs are suited for the dyeing e. g. of acetate artifical silk, synthetic fibres such as polyamide fibres, of polyurethane fibres, of polyester fibres or of polyacrylonitrile fibres, as well as of lacquers and plastics. The dyeings obtained with the new dyestuffs are distinguished by great brightness and good fastness to light.

The following examples illustrate the invention without, however, limiting it thereto.

*Example 1*

2/10 mol=3.54 grams of 5-amino-3-phenyl-1,2,4-thiodiazole are dissolved in 100 cc. of a 90 percent phosphoric acid and diazotized with 1.4 grams of sodium nitrite under strong cooling. Thereafter a solution of 2/10 mol of 1-dihydroxyethylamino-3-methylbenzene=2.90 grams in 25 cc. of a 50 percent acetic acid is added and the dyestuff thus formed is then precipitated by diluting with much water. The dyestuff is isolated, stirred with plenty of water and some sodium carbonate and then isolated and dried in customary manner. It represents a dark, bronzy powder which dissolves in alcohol and ethyl acetate with an intense bluish red color and corresponds to the formula

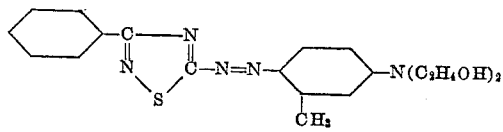

The dyestuff dyes acetate rayon and polyamide fibres clear, bluish red shades of good fastness to light. Similar dyestuffs are obtained if the 1-dihydroxyethylamino-3-methylbenzene is replaced by dihydroxyethylaminobenzene, 1-diethylamino-3-acetaminobenzene or 1-N-hydroxyethyl-N-butylamino-3-methylbenzene.

*Example 2*

2/10 mol=2.3 grams of 5-amino-3-methyl-1,2,4-thiodiazole are dissolved in 50 cc. of sulfuric acid of 40° Bé. and diazotized with 13.8 cc. of a 10 percent nitrite solution under strong cooling. To this diazo solution there is added a solution of 2/10 mol=3.67 grams of 1-diethylamino-3-chlorobenzene in 25 cc. of methanol, and after diluting with plenty of water the dyestuff is isolated. The product can be recrystallized from diluted alcohol, upon which it forms beautifully bronzy crystals. The dyestuff corresponds to the formula

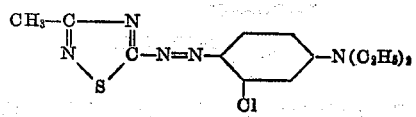

It dyes acetate rayon and polyamide fibres bright red shades. Similar dyestuffs are obtained if the 1-diethylamino-3-chloro-benzene is replaced by the diethylaminobenzene or 1-diethylamino-3-methylbenzene.

*Example 3*

2/10 mol=3.54 grams of 5-amino-3-phenyl-1,2,4-thiodiazole are dissolved in 50 cc. of glacial acetic acid to which 1.4 grams of solid sodium nitrite are added with cooling and stirring. After adding 5 cc. of pure sulfuric acid with permanent cooling, the solution is stirred for 15 minutes. To the diazo solution thus prepared 2/10 mol=3.18 grams of 1-amino-5-hydroxynaphthalene dissolved in glacial acetic acid are added, and the formed dyestuff is precipitated with water. It corresponds to the formula

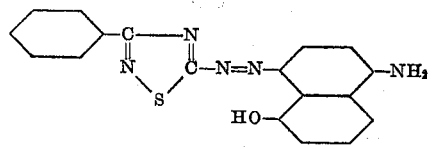

and dyes polyamide fibres blue shades of good fastness to water and washing. By replacing the 1-amino-5-hydroxynaphthalene by 3,6'-dihydroxy-1,2,3,4-tetrahydro-(benzo-1,2,7,8)-quinoline, a very clear, greenish blue is obtained.

*Example 4*

2/10 mol=2.62 grams of 5-amino-3-methoxy-1,2,4-thiodiazole are diazotized in 50 cc. of sulfuric acid of 40° Bé. with 1.4 grams of sodium nitrite to which a methanol solution of 2/10 mol=3.67 grams of 1-diethylamino-3-chlorobenzene is added. The dyestuff isolated by diluting in customary manner corresponds to the formula

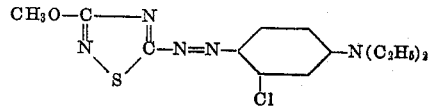

and dyes acetate rayon bluish red, very clear shades.

*Example 5*

2/10 mol=2.30 grams of 5-amino-3-methyl-1,2,4-thiodiazole are diazotized in 50 cc. of sulfuric acid of 40° Bé. with 13.8 cc. of a 10 percent nitrite solution under strong cooling and stirring. 2/10 mol=2.16 grams of methoxybenzene are then added to this diazo solution. The dyestuff quickly separates in the form of orange-yellow crystals which after having been isolated can be recrystallized from diluted alcohol. The dyestuff corresponds to the formula

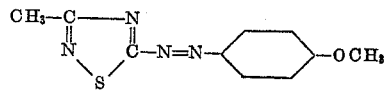

and dyes acetate rayon clear yellow shades.

I claim:
1. Monoazo dyestuffs free from sulfonic and carboxylic acid groups corresponding to the following general formula:

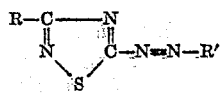

wherein R stands for a member selected from the group consisting of hydrogen, lower alkyl, lower alkoxy and monocyclic aryl, and R' for the radical of a coupling component selected from the group consisting of radicals of the benzene and naphthalene series.

2. Monoazo dyestuffs free from sulfonic and carboxylic acid groups corresponding to the general formula

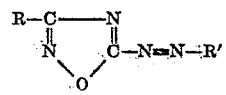

wherein R stands for a member selected from the group consisting of hydrogen, lower alkyl, lower alkoxy and monocyclic aryl and R' stands for the radical of an aminobenzene the amino group of which stands in p-position to the —N=N— bridge and is a

group, the radicals R'' and R''' being members selected from the group consisting of alkyl and hydroxyalkyl.

3. The monoazo dyestuff corresponding to the formula

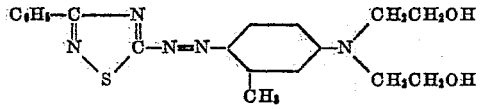

4. The monoazo dyestuff corresponding to the formula

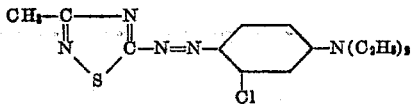

5. The monoazo dyestuff corresponding to the formula

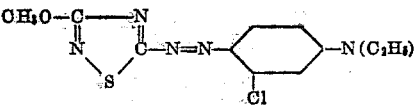

6. The monoazo dyestuff corresponding to the formula

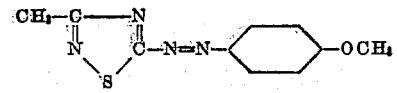

7. The monoazo dyestuff corresponding to the formula

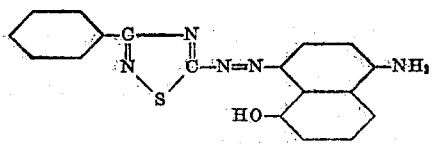

References Cited in the file of this patent
UNITED STATES PATENTS
2,659,719    Dickey et al. _____ Nov. 17, 1953
FOREIGN PATENTS
842,346    Germany _____ June 26, 1952